United States Patent
Sakata

(10) Patent No.: US 10,301,466 B2
(45) Date of Patent: May 28, 2019

(54) RESIN COMPOSITION, MOLDED PRODUCT, AND PLUMBING MECHANICAL COMPONENT

(71) Applicant: ASAHI KASEI KABUSHIKI KAISHA, Chiyoda-ku, Tokyo (JP)

(72) Inventor: Minoru Sakata, Tokyo (JP)

(73) Assignee: ASAHI KASEI KABUSHIKI KAISHA, Chiyoda-ku, Tokyo (JP)

( * ) Notice: Subject to any disclaimer, the term of this patent is extended or adjusted under 35 U.S.C. 154(b) by 100 days.

(21) Appl. No.: 15/554,214

(22) PCT Filed: Mar. 25, 2016

(86) PCT No.: PCT/JP2016/001767
§ 371 (c)(1),
(2) Date: Aug. 28, 2017

(87) PCT Pub. No.: WO2016/157872
PCT Pub. Date: Oct. 6, 2016

(65) Prior Publication Data
US 2018/0079902 A1 Mar. 22, 2018

(30) Foreign Application Priority Data
Mar. 27, 2015 (JP) .................. 2015-067025

(51) Int. Cl.
| C08K 5/092 | (2006.01) |
| C08L 71/12 | (2006.01) |
| C08K 9/06 | (2006.01) |
| C08L 25/06 | (2006.01) |
| C08L 53/02 | (2006.01) |

(52) U.S. Cl.
CPC ............ *C08L 71/123* (2013.01); *C08K 5/092* (2013.01); *C08K 9/06* (2013.01); *C08L 25/06* (2013.01); *C08L 53/02* (2013.01); *C08L 71/12* (2013.01); *C08L 2201/02* (2013.01); *C08L 2201/08* (2013.01); *C08L 2205/03* (2013.01)

(58) Field of Classification Search
USPC ....................................................... 524/112
See application file for complete search history.

(56) References Cited

U.S. PATENT DOCUMENTS

| 2004/0116583 A1 | 6/2004 | Okada et al. |
| 2007/0066742 A1 | 3/2007 | Mhetar et al. |
| 2007/0083035 A1 | 4/2007 | Riding et al. |
| 2008/0312371 A1 | 12/2008 | Todt et al. |
| 2010/0016508 A1 | 1/2010 | Sasagawa et al. |
| 2010/0179290 A1 | 7/2010 | Lietzau et al. |
| 2013/0142976 A1 | 6/2013 | Koevoets et al. |
| 2013/0274393 A1 | 10/2013 | Peters |

FOREIGN PATENT DOCUMENTS

| CN | 101273091 A | 9/2008 |
| CN | 101287799 A | 10/2008 |
| CN | 101501090 A | 8/2009 |
| CN | 101688058 A | 3/2010 |
| CN | 102272204 A | 12/2011 |
| CN | 104169366 A | 11/2014 |
| JP | H07207153 A | 8/1995 |
| JP | 2002284945 A | 10/2002 |
| JP | 3966941 B2 | 8/2007 |
| JP | 2009091400 A | 4/2009 |
| JP | 2010529283 A | 8/2010 |
| JP | 2012515248 A | 7/2012 |
| JP | 5430561 B2 | 3/2014 |
| JP | 2015500901 A | 1/2015 |

OTHER PUBLICATIONS

Jun. 28, 2016, International Search Report issued in the International Patent Application No. PCT/JP2016/001767.
Oct. 3, 2017, International Preliminary Report on Patentability issued in the International Patent Application No. PCT/JP2016/001767.
Feb. 7, 2018, Supplementary European Search Report issued by the European Patent Office in the corresponding European Patent Application No. 16771760.2.

*Primary Examiner* — Terressa Boykin
(74) *Attorney, Agent, or Firm* — Kenja IP Law PC

(57) ABSTRACT

Disclosed is a resin composition including: a resin mixture (a) containing a polyphenylene ether resin and atactic homopolystyrene in an amount of above 50 mass % and below 94 mass %; a hydrogenated block copolymer (b) obtained by hydrogenating at least part of a block copolymer containing polymer blocks A and B in an amount of 1 to 20 mass %; a functional group-containing compound (c) having a specific functional group in an amount of 0.01 to 0.5 mass %; and a surface-treated inorganic filler (d) in an amount of 5 mass % or more and less than 30 mass %, in which the resin composition does not substantially contain a polymer having a hydrogenation ratio of less than 98% in a conjugated diene compound portion, the component (a-1) has a weight average molecular weight of less than 70,000, and the component (b) has a number average molecular weight of 150,000 to 300,000.

20 Claims, No Drawings

RESIN COMPOSITION, MOLDED PRODUCT, AND PLUMBING MECHANICAL COMPONENT

TECHNICAL FIELD

This disclosure relates to a resin composition, a molded product, and a plumbing mechanical component.

BACKGROUND

Polyphenylene ether resin has excellent electrical insulating properties and good heat resistance, flame retardancy, and hydrolysis resistance, and is thus conventionally used in various applications such as home electric appliances, office automation equipment, and automotive parts.

Recently, to manufacture resin parts for various uses, demands are increasingly being made for a resin composition that is excellent in electrical insulation properties, impact resistance, heat resistance, hydrolysis resistance, vibration fatigue characteristics, flame retardancy, surface appearance of molded products, and so on. On the other hand, due to miniaturization of resin parts and complications of their structure, such a resin composition is also required to have excellent melt flowability at the time of injection molding.

In particular, for applications in plumbing mechanical components (pump casings (pump housings), valves, etc.) used for water circulation, such a resin composition is required to have high toughness, vibration fatigue characteristics, melt flowability, and hydrolysis resistance.

CITATION LIST

Patent Literature

PTL 1: JP5430561B
PTL 2: JP2015500901A
PTL 3: JP3966941B

SUMMARY

Technical Problem

For the purpose of improving the toughness of a resin composition, a conventional technique describes the use of polyphenylene ether having a specific molecular weight distribution (for example, see JP5430561B (PTL 1)). However, although the resin material in PTL 1 has good toughness, it contains a large amount of glass fiber, and has the problems of insufficient melt flowability on its own and inadequate surface appearance and lightweight properties of the molded product.

Similarly, for the purpose of improving the toughness of the resin composition, another conventional technique describes using a polyphenylene ether-containing resin composition that has a molecular weight as measured after the compounding process (after subjection to melt-kneading) in a predetermined range (see, for example, JP2015500901A (PTL 2)). However, the resin material in PTL 2 also has the problems of insufficient melt flowability on its own and inadequate surface appearance of the molded product, and so on.

Still another conventional technique describes adding an elastomer to polyphenylene ether for the purpose of improving mechanical strength such as impact resistance and durability such as hot water resistance of the resin composition (see, for example, JP3966941B (PTL 3)). However, although the impact resistance of the resin material in PTL 3 is improved, there is room for improvement in melt flowability, vibration fatigue characteristics, and the like.

As described above, the resin composition reinforced with the filler described in the conventional techniques has still room for improvement in terms of compatibility between melt flowability and vibration fatigue characteristics.

It could thus be helpful to provide a resin composition that has excellent melt flowability and vibration fatigue characteristics, that has heat resistance and impact resistance while maintaining a good balance with these properties, and that exhibits excellent surface appearance.

Solution to Problem

As a result of extensive studies to solve the above problems, we found that such a resin composition is excellent in melt flowability, vibration fatigue characteristics, heat resistance, impact resistance, and surface appearance that contains, in a specific compositional range, a resin mixture (a) containing a polyphenylene ether resin (a-1) and atactic homopolystyrene (a-2), a hydrogenated block copolymer with a specific block structure (b), a functional group-containing compound with a specific functional group (c), and a surface-treated inorganic filler (d), and in which the physical properties of the components (a-1) and (b) are optimized. The present disclosure was completed based on the findings.

The primary features of the present disclosure are as follows.

[1] A resin composition comprising the following components: a resin mixture (a) containing a component (a-1) and a component (a-2) in a total amount of the components (a-1) and (a-2) of more than 50 mass % and less than 94 mass %, the component (a-1) being a polyphenylene ether resin (a-1) and the component (a-2) being atactic homopolystyrene (a-2); a hydrogenated block copolymer (b) in an amount of 1 mass % or more and 20 mass % or less, the hydrogenated block copolymer (b) being obtained by hydrogenating at least part of a block copolymer containing a polymer block A composed mainly of a vinyl aromatic compound and a polymer block B composed mainly of a conjugated diene compound; a functional group-containing compound (c) in an amount of 0.01 mass % or more and 0.5 mass % or less, the functional group-containing compound (c) having at least one functional group selected from the group consisting of a carboxyl group and a group derived from a carboxyl group; and a surface-treated inorganic filler (d) in an amount of 5 mass % or more and less than 30 mass %, wherein the resin composition does not substantially contain a polymer having a hydrogenation ratio of less than 98% in a conjugated diene compound portion, the component (a-1) has a weight average molecular weight, Mw, of less than 70,000, and the component (b) has a number average molecular weight, Mn, of 150,000 or more and 300,000 or less.

[2] The resin composition according to [1], wherein the component (a-1) exhibits a melting point.

[3] The resin composition according to [1] or [2], wherein the component (a-2) is contained in an amount of 0.1 parts by mass or more and 95 parts by mass or less per 100 parts by mass in total of the components (a-1) and (a-2).

[4] The resin composition according to any one of [1] to [3], wherein the component (c) is at least one compound selected from the group consisting of fumaric acid, maleic acid and maleic anhydride, succinic acid, citric acid, aconitic acid, itaconic acid, citraconic acid, and mesaconic acid.

[5] The resin composition according to any one of [1] to [4], wherein the component (d) is an inorganic filler surface-treated with aminosilane or epoxysilane.
[6] The resin composition according to any one of [1] to [5], wherein the component (d) is a surface-treated glass fiber, and a ratio of an average fiber length L to an average fiber diameter D of the glass fiber, as expressed by L/D, is from 24 to 50.
[7] The resin composition according to any one of [1] to [6], wherein the component (d) is a surface-treated glass fiber, and an area of peaks at 3570 $cm^{-1}$ in an FT-IR spectrum, as measured on the surface of the glass fiber using a diffusive reflector, is 9 or less when calcium fluoride powder is used as a blank.
[8] The resin composition according to any one of [1] to [7], wherein the component (d) is a surface-treated glass fiber, and the surface of the glass fiber contains nitrogen atoms in an amount of 1 mass ppm or more and 500 mass ppm or less relative to the mass of the glass fiber.
[9] The resin composition according to [8], wherein the component (d) is a surface-treated glass fiber, and the surface of the glass fiber contains nitrogen atoms in an amount of 10 mass ppm or more and 80 mass ppm or less relative to the mass of the glass fiber.
[10] A molded product comprising the resin composition as recited in any one of [1] to [9].
[11] A plumbing mechanical component formed from the molded product as recited in [10].
[12] The plumbing mechanical component according to [11], wherein the plumbing mechanical component is used in contact with drinking water.

Advantageous Effect

According to the present disclosure, it is possible to provide a resin composition that has excellent melt flowability and vibration fatigue characteristics, that has heat resistance and impact resistance while maintaining a good balance with these properties, and that exhibits excellent surface appearance. In particular, the resin composition disclosed herein does not substantially contain a polymer having a hydrogenation ratio of less than 98% in a conjugated diene compound portion, causing less leaching of monomers from the conjugated diene compound. Therefore, the resin composition is suitably used for parts of valves and filters contacting drinking water in use.

DETAILED DESCRIPTION

The following provides details of an embodiment for applying the present disclosure (hereinafter "this embodiment"). The following embodiment is described by way of example only, and the present disclosure is not limited to the embodiment and various modifications may be made without departing from the gist of the present disclosure.
(Resin Composition)
The resin composition according to this embodiment comprises the following components:
a resin mixture (a) containing a polyphenylene ether resin (a-1) and atactic homopolystyrene (a-2);
a hydrogenated block copolymer (b) obtained by hydrogenating at least part of a block copolymer containing a polymer block A composed mainly of a vinyl aromatic compound and a polymer block B composed mainly of a conjugated diene compound;
a functional group-containing compound (c) having at least one functional group selected from the group consisting of a carboxyl group and a group derived from a carboxyl group; and
a surface-treated inorganic filler (d).
The resin composition according to this embodiment may further comprise other optional components.
In the resin composition according to this embodiment, the component (a-1) has a weight average molecular weight, Mw, of less than 70,000, the component (b) has a number average molecular weight, Mn, of 150,000 or more and 300,000 or less, and a conjugated diene compound portion constituting the polymer block B has a hydrogenation ratio of 98% or more.
—Resin Mixture (a)—
The resin mixture (a) used in this embodiment contains a polyphenylene ether resin (a-1) and atactic homopolystyrene (a-2).
——Polyphenylene Ether Resin (a-1)——
Examples of the polyphenylene ether resin (a-1) (hereinafter also referred to simply as "the component (a-1)") used in this embodiment include, but are not limited to, a homopolymer or copolymer having a repeating unit structure represented by:

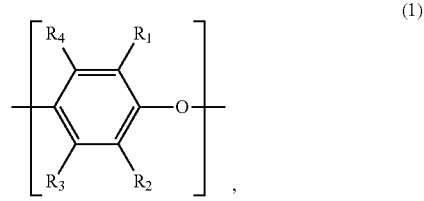

where $R^1$, $R^2$, $R^3$, and $R^4$ are each independently selected from the group consisting of a hydrogen atom, a halogen atom, a $C_1$-$C_7$ primary alkyl group, a $C_1$-$C_7$ secondary alkyl group, a phenyl group, a haloalkyl group, an amino alkyl group, a hydrocarbon oxy group, and a halohydrocarbon oxy group having at least two carbon atoms between a halogen atom and an oxygen atom.
Such polyphenylene ether resin is not particularly limited, and any known one may be used. Specific examples of polyphenylene ether include: homopolymers such as poly(2,6-dimethyl-1,4-phenylene ether), poly(2-methyl-6-ethyl-1,4-phenylene ether), poly(2-methyl-6-phenyl-1,4-phenylene ether), and poly(2,6-dichloro-1,4-phenylene ether); and copolymers such as copolymers of 2,6-dimethylphenol and other phenols such as 2,3,6-trimethylphenol and 2-methyl-6-butylphenol.
Preferred as the polyphenylene ether resin, among other things, from the perspectives of availability and mechanical properties of the resulting resin composition, are poly(2,6-dimethyl-1,4-phenylene ether) and a copolymer of 2,6-dimethylphenol and 2,3,6-trimethylphenol, and particularly preferred is poly(2,6-dimethyl-1,4-phenylene ether).
The polyphenylene ether resins listed above may be used alone or in combination of two or more.
From the viewpoint of imparting suitable physical properties to the resin, the component (a-1) preferably has a reduced viscosity of 0.30 dL/g or more, and more preferably 0.40 dL/g or more, while from the perspective of increasing the flowability of the resin, the reduced viscosity is preferably 0.60 dL/g or less, and more preferably 0.54 dL/g or less.

The reduced viscosity can be measured with a Ubbelohde viscometer using a 0.5 g/dL chloroform solution of the resin at 30° C.

The component (a-1) is preferably a polyphenylene ether resin exhibiting a melting point.

As used herein, the term "polyphenylene ether resin exhibiting a melting point" refers to a polyphenylene ether resin in which a peak is observed in a temperature-heat flow rate graph obtained by measurement with a differential scanning calorimeter (DSC) (at a heating rate of 20° C./min). The temperature at the top of this peak is taken as the melting point of the polyphenylene ether resin. When there are a plurality of temperatures at the top of the peak, the highest temperature among them is used as the melting point.

A powdery polyphenylene ether resin that is obtained by polymerizing monomers and precipitating the polymers in a solution exhibits a melting point.

When the powdery polyphenylene ether resin is melted alone or in a state mixed with another resin or the like, the molten resin comes to exhibit no melting point. Based on this finding, the polyphenylene ether resin exhibiting a melting point is, but not limited to, normally a powdery polyphenylene ether resin. On the other hand, the above-described polyphenylene ether resin exhibiting a melting point exhibits a melting point when solidified under high pressure without melting, or when dissolved in a solvent and molded as appropriate into a film-shape or a lump before removal of the solvent.

In view of these findings, it is preferable that the polyphenylene ether resin exhibiting a melting point is a powdery polyphenylene ether resin and is unmelted.

In the case where the component (a-1) is a polyphenylene ether resin exhibiting a melting point, from the perspective of increasing the heat resistance of the resin composition, the melting point of the polyphenylene ether resin is preferably 230° C. or higher, and more preferably 240° C. or higher, and is preferably 255° C. or lower.

For further information on the relationship between a polyphenylene ether resin exhibiting a melting point and its melting point, the interested reader is referred to *Journal of Polymer Science, Part A-2* (6), pp. 1141-1148 (1968), *European Polymer Journal* (9), pp. 293-300 (1973), *Polymer* (19), pp. 81-84 (1978), and so on.

Regarding the mix proportion of a polyphenylene ether resin exhibiting no melting point and the polyphenylene ether resin exhibiting a melting point, the polyphenylene ether resin exhibiting no melting point is preferably 75 parts by mass or less, more preferably 50 parts by mass or less, and particularly preferably 0 parts by mass, per 100 parts by mass of the mixture, from the perspective of suppressing deterioration of melt flowability and vibration fatigue characteristics of the resin composition.

The polyphenylene ether resin may be produced by a known method. Examples of the production method for the polyphenylene ether resin include, but are not limited to, a method of oxidatively polymerizing 2,6-xylenol using a mixture of a cuprous salt and an amine as a catalyst as described in U.S. Pat. No. 3,306,874A to Hay, and other methods described in U.S. Pat. Nos. 3,306,875A, 3,257,357A, 3,257,358A, JPS5217880B, JPS5051197A, JPS63152628A, and so on.

The weight average molecular weight (Mw) of the above-mentioned component (a-1) before the formation of the resin composition comprising the respective components (in a raw material state) is preferably 30,000 or more and more preferably 35,000 or more, and preferably 55,000 or less and more preferably 54,000 or less, from the perspective of setting the weight average molecular weight (Mw) of the component (a-1) within the range as described later.

The weight average molecular weight (Mw) may be determined by a conventionally known method using gel permeation chromatography (GPC) (mobile phase: chloroform, reference material: polystyrene).

——Atactic Homopolystyrene (a-2)——

Typical examples of the atactic homopolystyrene (a-2) used in this embodiment (hereinafter also referred to simply as "the component (a-2)") include, but are not limited to, homopolymers of styrenic compounds (homopolystyrenes) or copolymers of two or more styrenic compounds, having atactic microstructures (stereoregularity).

These atactic homopolystyrenes may be used alone or in combination of two or more.

Among these, homopolymers of styrenic compounds are preferable to copolymers of styrenic compounds from the perspective of improving vibration fatigue characteristics of the resin composition.

As microstructures of polystyrenes, atactic and syndiotactic ones are both commercially available. However, syndiotactic polystyrene is expensive, and when mixed with the polyphenylene ether resin (a-1), it may lose crystallinity, which is an advantage of syndiotactic polystyrene, depending on the composition ratio. A composition containing syndiotactic polystyrene lost in crystallinity and the polyphenylene ether resin (a-1) has substantially the same properties as those of a composition containing atactic polystyrene and the polyphenylene ether resin (a-1) in the same composition ratio. In view of the above circumstances, atactic polystyrene is used for the resin mixture (a) in this embodiment.

Regarding the composition ratio of the polyphenylene ether resin (a-1) and the atactic homopolystyrene (a-2), the component (a-2) is preferably 0.1 parts by mass or more, more preferably 0.5 parts by mass or more, and particularly preferably 1 part by mass or more, and is preferably 95 parts by mass or less, more preferably 90 parts by mass or less, particularly preferably 85 parts by mass or less, and most preferably 80 parts by mass or less, per 100 parts by mass in total of the components (a-1) and (a-2).

The mix proportion of the components (a-1) and (a-2) per 100 mass % of the resin composition according to this embodiment is more than 50 mass %, and preferably 55 mass % or more, and is less than 94 mass %, preferably 90 mass % or less, and more preferably 85 mass % or less, from the perspective of improving the melt flowability, vibration fatigue characteristics, and heat resistance of the resin composition.

In the resin composition according to this embodiment, in addition to the components (a-1) and (a-2), one or more other resins may be added to the resin mixture (a).

In the resin composition according to this embodiment, a polyphenylene ether resin exhibiting a melting point may be used as the component (a-1), and a resin other than the polyphenylene ether resin exhibiting a melting point (e.g., a polyphenylene ether resin that came to exhibit no melting point), may be used as another resin.

In addition, in the resin composition according to this embodiment, a melt of a polyphenylene ether resin and another resin may be used as the component (a-1). In this case, the melt contains a polyphenylene ether resin that came to exhibit no melting point.

Any resin compositions containing such polyphenylene ether resin exhibiting no melting point are also encompassed within the scope of the disclosure as long as the effect of the disclosure is obtained.

As used herein, the resin mixture (a) refers to a mixture obtained by simply mixing, without melt-kneading, the components (a-1) and (a-2) and other optional resins. After the resin mixture (a) is melt-kneaded and pelletized, as described above, the polyphenylene ether resin (a-1) no longer exhibits a melting point, which is not preferable.

—Hydrogenated Block Copolymer (b)—

The hydrogenated block copolymer (b) used in this embodiment (hereinafter also simply referred to as "the component (b)") is obtained by hydrogenating at least part of a block copolymer containing a polymer block A composed mainly of a vinyl aromatic compound and a polymer block B composed mainly of a conjugated diene compound. The component (b) acts as an impact resistance-imparting agent in the resin composition according to this embodiment.

Examples of the block structure of the hydrogenated block copolymer include, but are not limited to, when the polymer block A is represented by "A" and the polymer block B by "B", A-B, A-B-A, B-A-B-A, (A-B—)$_4$Si, and A-B-A-B-A for the component (b). For example, (A-B—)$_4$Si is a residue of reactive residues of the multifunctional coupling agent (such as silicon tetrachloride).

——Polymer Block A——

Examples of the polymer block A composed mainly of a vinyl aromatic compound include, but are not limited to, a homopolymer block of a vinyl aromatic compound or a copolymer block of a vinyl aromatic compound and a conjugated diene compound.

For the polymer block A, the phrase "composed mainly of a vinyl aromatic compound" means that the content of the vinyl aromatic compound in the polymer block A before hydrogenation is more than 50 mass %. This content is preferably 70 mass % or more, and may be 100 mass % or less.

Examples of the vinyl aromatic compound constituting the polymer block A include, but are not limited to, styrene, c-methyl styrene, vinyltoluene, p-tert-butylstyrene, and diphenylethylene; among these preferred is styrene. These vinyl aromatic compounds may be used alone or in combination of two or more.

——Polymer Block B——

Examples of the polymer block B composed mainly of a conjugated diene compound include, but are not limited to, a homopolymer block of a conjugated diene compound or a copolymer block of a conjugated diene compound and a vinyl aromatic compound.

For the polymer block B, the phrase "composed mainly of a conjugated diene compound" means that the content of a conjugated diene compound portion in the polymer block B before hydrogenation is more than 50 mass %. This content is preferably 70 mass % or more, and may be 100 mass % or less.

Examples of the conjugated diene compound constituting the polymer block B include, but are not limited to, butadiene, isoprene, 1,3-pentadiene, and 2,3-dimethyl-1,3-butadiene; among these preferred are butadiene, isoprene, and a combination thereof, and more preferred are butadiene and isoprene. These conjugated diene compounds may be used alone or in combination of two or more.

Regarding the microstructure (bonding form of the conjugated diene compound) of the polymer block B, the total of the amount of 1,2-vinyl bonds and the amount of 3,4-vinyl bonds (hereinafter also referred to as "the total amount of vinyl bonds") is preferably 2% or more, and preferably 90% or less, and more preferably 80% or less, from the perspective of increasing the heat resistance of the resin composition. For example, the total amount of vinyl bonds is preferably from 30% to 90% for the polymer block B composed mainly of butadiene, and from 2% to 80% for the polymer block B composed mainly of isoprene.

The sum of the amount of 1,2-vinyl bonds and the amount of 3,4-vinyl bonds (the total amount of vinyl bonds) refers to the percentage of the sum of the amount of 1,2-vinyl bonds and the amount of 3,4-vinyl bonds in the polymer block B before hydrogenation with respect to the total of the amount of 1,2-vinyl bonds, the amount of 3,4-vinyl bonds, and the amount of 1,4-conjugated bonds. The total amount of vinyl bonds may be measured and calculated using an infrared spectrophotometer or a nuclear magnetic resonance apparatus (NMR).

Examples of the molecular structure of the block copolymer of the hydrogenated block copolymer include, but are not limited to, a linear, branched, or radial structure, or combinations thereof.

The distribution of the vinyl aromatic compound in the molecular chain of the polymer block A and the conjugated diene compound in the molecular chain of the polymer block B, both polymer blocks being contained in the block copolymer, is not limited to a particular form, and examples thereof include random, tapered (in which the monomer portion is increased or decreased along the molecular chain), or partially blocked, or combinations thereof.

When the block copolymer contains a plurality of polymer blocks A or B, the polymer blocks A or B may have the same structure or different structures.

From the perspective of increasing the dispersibility of the hydrogenated block copolymer (b) in the component (a) throughout the entire block copolymer containing the polymer blocks A and B, the content of the vinyl aromatic compound in the block copolymer before hydrogenation is preferably 20 mass % or more, and more preferably 30 mass % or more, and is preferably 95 mass % or less, and more preferably 80 mass % or less.

The content of the vinyl aromatic compound may be measured with an ultraviolet spectrophotometer.

The number average molecular weight (Mn) of the block copolymer before hydrogenation is 150,000 or more, and preferably 200,000 or more, and is preferably 300,000 or less, from the perspective of increasing the impact resistance and melt flowability of the resin composition according to this embodiment.

The number average molecular weight (Mn) may be determined by a conventionally known method using GPC (mobile phase: chloroform, standard material: polystyrene).

The molecular weight distribution (Mw/Mn) of the block copolymer before hydrogenation is preferably 10 or less, and more preferably 5 or less.

The molecular weight distribution (Mw/Mn) is calculated by dividing the weight average molecular weight (Mw) determined with a conventionally known method by the aforementioned number average molecular weight (Mn), using GPC (mobile phase: chloroform, reference material: polystyrene).

There are no particular restrictions on the method of hydrogenating the block copolymer, and examples thereof include, but are not limited to, hydrogenation methods performed under the conditions of reaction temperature from 0° C. to 200° C. and hydrogen pressure from 0.1 MPa to 15 MPa, using: (1) a support-type heterogeneous hydrogenation catalyst in which a metal such as Ni, Pt, Pd, or Ru is supported on carbon, silica, alumina, diatomaceous earth, or the like; (2) a so-called Ziegler-type hydrogenation catalyst using an organic acid salt using such as Ni, Co, Fe or Cr or a transition metal salt such as an acetylacetone salt and a reducing agent such as organoaluminum; or (3) a homogeneous hydrogenation catalyst such as a so-called organometallic complex such as an organometallic compound using such as Ti, Ru, Rh, or Zr.

The above hydrogenation causes fatty chain double bonds to be reduced in the conjugated diene compound that is the main component of the polymer block B of the hydrogenated block copolymer and in another conjugated diene compound which can be contained in the polymer block A of the hydrogenated block copolymer.

The hydrogenation ratio of the conjugated diene compound portion in the hydrogenated block copolymer is not particularly limited. However, from the perspective of increasing the impact resistance and melt flowability of the resin composition, the hydrogenation ratio is preferably 98% or more, more preferably 99% or more, still more preferably 99.5% or more, with respect to the total amount of double bonds derived from the conjugated diene compound. In particular, when the hydrogenated block copolymer contains a butadiene portion, decomposition of the butadiene portion or occurrence of crosslinking can be suppressed by setting the hydrogenation ratio within the above range.

The hydrogenation rate can be measured and calculated using an infrared spectrophotometer or a nuclear magnetic resonance apparatus (NMR).

The production method for the hydrogenated block copolymer (b) is not particularly limited, and a known production method may be used. Specific examples of known production methods include those described in, for example, JPS4711486A, JPS4966743A, JPS5075651A, JPS54126255A, JPS5610542A, JPS5662847A, JPS56100840A, JPH2300218A, GB1130770A, U.S. Pat. Nos. 3,281,383A, 3,639,517A, GB1020720A, U.S. Pat. Nos. 3,333,024A, and 4,501,857B.

Typical examples of the hydrogenated block copolymer (b) include styrene-ethylene-butylene-styrene (SEBS) block copolymers and styrene-ethylene-propylene-styrene (SEPS) block copolymers. These block copolymers may be used alone or in combination of two or more.

The mix proportion of the component (b) per 100 mass % of the resin composition according to this embodiment is 1 mass % or more, and preferably 2 mass % or more, and is 20 mass % or less, and preferably 15 mass % or less, from the perspective of imparting the desired impact resistance, vibration fatigue characteristics, and the like to the resin composition.

From the perspective of suppressing deterioration of vibration fatigue characteristics and surface appearance, the resin composition according to this embodiment does not substantially contain a polymer having a hydrogenation ratio of less than 98% in the conjugated diene compound portion.

As used herein, the phrase "does not substantially contain" means that the content is no more than 0.3 mass % per 100 mass % of the resin composition according to this embodiment.

As used herein, the conjugated diene compound refers to any of those listed above as conjugated diene compounds constituting the polymer block B, such as butadiene, isoprene, and the like, and the conjugated diene compound portion refers to a portion derived from a conjugated diene compound in these homopolymers or copolymers.

More specifically, when high impact polystyrene, which is a rubber modified polystyrene resin comprising a graft polymer of styrene and polybutadiene, is used as the component (a-2), the polybutadiene portion contained in the high impact polystyrene has a hydrogenation ratio of not less than 98%, the resulting resin composition contains a polymer having a hydrogenation ratio of less than 98% in the conjugated diene compound portion.

According to this embodiment, the hydrogenation ratio of the conjugated diene compound portion in each component (such as the components (a) and (b)) of the resin composition is also 98% or more from the perspective of suppressing deterioration of the vibration fatigue characteristics and surface appearance of the resin composition.

—Functional Group-containing Compound (c)—

The functional group-containing compound (c) used in this embodiment (hereinafter also simply referred to as "the component (c)") contains at least one functional group selected from the group consisting of a carboxyl group and a group derived from a carboxyl group.

Compounds having a carboxyl group include fumaric acid, maleic acid, succinic acid, citric acid, aconitic acid, itaconic acid, citraconic acid, mesaconic acid, chloromaleic acid, and cis-4-cyclohexene-1,2-dicarboxylic acid, and, in particular, preferred are α,β-unsaturated dicarboxylic acid (such as maleic acid, aconitic acid, citraconic acid, chloromaleic acid, fumaric acid, and mesaconic acid) and saturated tricarboxylic acid (such as citric acid).

Examples of the group derived from a carboxyl group include an acid anhydride group, an ester group, and the like.

Examples of the compound having an acid anhydride group include maleic anhydride, succinic anhydride, aconitic acid 1,3-anhydride, citraconic anhydride, chloromaleic anhydride, cis-4-cyclohexene-1,2-dicarboxylic acid anhydride, and the like.

Examples of the compound having an ester group include compounds obtained by reaction between the above-described compound having a carboxyl group and alcohols such as ethanol. Since the compound having an ester group is decomposed to a carboxyl group at the processing temperature of the resin composition, it may be used as a compound substantially containing a carboxyl group for the resin composition according to this embodiment.

These compounds may be used alone or in combination of two or more.

Specifically, preferred as the functional group-containing compound (c) are fumaric acid, maleic acid and maleic anhydride, succinic acid, citric acid, aconitic acid, itaconic acid, citraconic acid, and mesaconic acid; among these most preferred are maleic acid, maleic anhydride, and citric acid.

The mix proportion of the component (c) per 100 mass % of the resin composition according to this embodiment is 0.01 mass % or more, preferably 0.05 mass % or more, and more preferably 0.1 mass % or more from the perspective of improving the melt flowability and vibration fatigue characteristics of the resin composition, and is 0.5 mass % or less, and more preferably 0.4 mass % from the perspectives of reducing silver streaks of the resin composition and reducing the amount of gas produced during processing of the resin composition.

—Surface-Treated Inorganic Filler (d)—

The surface-treated inorganic filler (d) used in this embodiment (hereinafter also referred to simply as "the component (d)") is not particularly limited, and known ones may be used; preferred are a fibrous filler and a plate-like filler.

Fibrous fillers include, but are not limited to, whiskers such as glass fiber, carbon fiber, and potassium titanate whisker, calcium silicate (wollastonite), and the like.

Plate-like fillers include, but are not limited to, glass flakes, mica, talc, and the like.

These fillers may be used alone or in combination of two or more.

Examples of the surface treatment to be performed on the inorganic filler include, but are not limited to, surface treatment using coupling agents such as silane-based and titanate-based ones; in particular, preferred is a surface treatment using a silane-based coupling agent such as aminosilane or epoxysilane, from the perspectives of improving adhesion between the resin and the inorganic filler subjected to the surface treatment and improving vibration fatigue characteristics and impact resistance of the resin composition.

Preferred examples of the silane-based coupling agent (silane coupling agent) used for the surface treatment include, but are not limited to, 3-aminopropyltriethoxysilane, 3-aminopropyltrimethoxysilane, N-2-(aminoethyl)-3-aminopropylmethoxysilane, 3-glycidoxypropyltrimethoxysilane, 3-glycidoxypropyltriethoxysilane. Examples of the method of surface-treating the inorganic filler include a method in which, in the case of the inorganic filler being a glass fiber, a silane coupling agent is coated and dried on the surface together with a sizing agent for spinning and bundling of a fibrous inorganic filler. Another exemplary method is to, in the case of the inorganic filler being in the form of short fibers or powder, impregnating these fillers into the silane coupling agent solution and then drying. The temperature for drying is preferably 100° C. or higher.

In the case of the inorganic filler being a fibrous filler, it has a fiber length of 2 mm or more upon delivery from an inorganic filler manufacture (before being kneaded in an extruder), yet when subjected to melt-mixing with the components (a-1), (a-2), (b), and (c), particularly when kneaded in an extruder or the like under specific conditions, fibers are broken into proper lengths so that the ratio of the average length (L) to the average diameter (D) of the fibers, as expressed by L/D, is 24 or more and 50 or less.

When the filler is kneaded under high kneading conditions to increase the dispersibility of the resin and fibers, the average fiber length decreases. Conversely, when the filler is kneaded under low kneading conditions, the average fiber length increases, yet the dispersibility of the fiber length of the resin decreases. To provide good toughness, it is required that the resin and the fibers are uniformly mixed and that the fiber length is long. From this perspective, the ratio (L/D) is preferably 24 or more. When the fiber length is extremely long, however, the appearance is remarkably deteriorated, although the toughness is good. From this perspective, the ratio (L/D) is preferably 50 or less.

The lower limit of the ratio (L/D) is more preferably 25, and still more preferably 26, and the upper limit is more preferably 40, and even more preferably 35.

Next, a method of adjusting the ratio of the average length (L) to the average diameter (D) of fibers, as expressed by L/D, will be described.

In general, to improve the dispersibility while maintaining the fiber length of the inorganic filler, a known method is to lower the melt viscosity of the components (a-1), (a-2), (b), and (c) by adding a liquid plasticizer. However, for plumbing parts used for water circulation which can be a main application of the present disclosure, in the case of using a liquid plasticizer, such method is not preferable because the plasticizer elutes from the surface of the molded product. In the present disclosure, it is desirable to disperse the inorganic filler in a resin mixture having a high melt viscosity using a general-purpose extruder, without adding a plasticizer. To this end, the conditions in the first step in which the surface of the inorganic filler is chemically bonded to the polyphenylene ether resin and in the second step in which shearing is applied for dispersion are important, and the process preferably proceeds in a stepwise manner in the two steps.

In the first step, this inorganic filler is brought into contact with the components (a-1), (a-2), (b), and (c), and, to obtain good dispersibility while maintaining the fiber length of the inorganic filler, the temperature of the resin at the time of contact with the inorganic filler is preferably adjusted to 280° C. or higher and 350° C. or lower. If the temperature is below 280° C., the reaction may not proceed due to low temperature. On the other hand, if the temperature is above 350° C., the crosslinking reaction of the polyphenylene ether takes precedence, and the reaction with the surface of the inorganic filler may not proceed.

The reaction time is preferably from 5 seconds to 30 seconds. If the reaction time is shorter than 5 seconds, the binding reaction may not proceed. If the reaction time exceeds 30 seconds, the reaction may not proceed.

During the reaction in the first step, deformation due to shearing is preferably minimized. In the case of using a multi-screw extruder, it is preferable to suppress the shear deformation to the minimum by using a feed screw, rather than a kneading disc, in this residence time.

In the second step, rapid stirring is preferably performed for dispersion. In the case of using a multi-screw extruder, it is desirable to separate flow passages using a kneading disc. The residence time of the kneading disc portion is preferably 5 seconds or more and 20 seconds or less.

In the case of the inorganic filler being a plate-like filler, it is preferable from the perspective of obtaining a sufficient reinforcing effect of the filler that the ratio of the average plate diameter (R) to the average thickness (H) of the plate, as expressed by R/H, is preferably 5 or more, more preferably 10 or more, and particularly preferably 20 or more.

From the perspectives of the melt flowability, vibration fatigue characteristics, and heat resistance of the resin composition and the surface appearance and specific gravity of the molded product, the mix proportion of the component (d) is 5 mass % or more, preferably 7 mass % or more, and more preferably 10 mass % or more, and is less than 30 mass %, preferably 28 mass % or less, and more preferably 25 mass % or less, per 100 mass % of the resin composition according to this embodiment.

—Other Optional Components (e))—

In addition to the components (a) to (d), the resin composition according to this embodiment may further contain other components as required within the range not to impair the melt flowability, vibration fatigue characteristics, or the like of the resin composition according to this embodiment (hereinafter also simply referred to as "the components (e)").

Examples of the other components include, but are not limited to, antioxidants, metal deactivators, flame retardants (such as organophosphate compounds, condensed organophosphate compounds, ammonium polyphosphate compounds, and silicone compounds flame retardants), plasticizers (such as low molecular weight polyethylene, epoxidized soybean oil, polyethylene glycol, and fatty acid esters), weather (light) resistance-improving agents, slip agents, inorganic or organic fillers and reinforcing materials (such as polyacrylonitrile fibers and aramid fibers), colorants, and mold release agents.

Regarding the weight average molecular weight (Mw) of the component (a-1) in the resin composition according to this embodiment, that is, the weight average molecular weight (Mw) of the component (a-1) at the time of forming the resin composition comprising the components (a) to (e) (after the compounding process), the upper limit is less than 70,000, preferably less than 68,000, and more preferably less than 66,000 from the perspective of increasing the melt flowability of the resin composition, while the lower limit is not particularly limited, yet from the perspective of enhancing the vibration fatigue characteristics of the resin composition, the lower limit is preferably 30,000.

The number average molecular weight (Mn) of the component (b) in the resin composition according to this embodiment, namely the number average molecular weight (Mn) of the component (b) at the time of forming the resin composition comprising the components (a) to (e) (after the compounding process), may be the same as the number average molecular weight (Mn) of the above-described block copolymer before hydrogenation.

In the resin composition according to this embodiment, when 1,3-butadiene is used as the monomer component, the content of 1,3-butadiene in the resin composition is no more than 1 mass ppm (mg per kg of the resin composition), more preferably 0.8 mass ppm or less, and still more preferably 0.5 mass ppm or less.

Exemplary methods for measuring the content of 1,3-butadiene include the one described in the Examples of this disclosure.

A preferred resin composition according to this embodiment will be described in detail below.

In the preferred resin composition according to this embodiment, a powdered polyphenylene ether resin exhibiting a melting point, which is commonly obtained by causing precipitation after polymerization, is preferably used as the component (a-1). In this case, in part of the polyphenylene ether resin, an amino group derived from the polymerization solvent and an unreacted hydroxyl group derived from the monomer are attached to the terminals of the resin. The interaction among (i) the amino group and hydroxyl group present at the terminals, (ii) functional group-containing compound (c) having at least one functional group selected from the group consisting of a carboxyl group and a group derived from carboxyl group, and (iii) modifying groups present on the surface of the surface-treated inorganic filler (d) allows the surface-treated inorganic filler (d) and the polyphenylene ether resin to adhere to each other more easily. Accordingly, the resin composition exhibits excellent impact resistance and vibration fatigue characteristics.

Among inorganic fillers, fibrous filler glass fiber is preferable in terms of strength and cost. However, the resin or other substances has low adhesive strength on the surface of the glass fiber, and the interface strength between the resin and the glass fiber is extremely low even when the glass fiber is uniformly mixed with the resin, the effect of improving the strength of the composition may not be sufficiently obtained by the addition of the glass fiber.

In order to increase the strength-improving effect, it is desirable to couple the resin and the glass fiber by chemical bonding.

Specifically, it is preferable to use the aforementioned polyphenylene ether resin exhibiting a melting point as the component (a-1). In part of the polyphenylene ether resin exhibiting a melting point, an amino group derived from a polymerization solvent and an unreacted hydroxyl group derived from a monomer are present at the terminals of the resin. The use of the polyphenylene ether resin exhibiting a melting point may cause a chemical reaction to occur between the amino or hydroxyl group of the resin and the surface of the glass fiber.

However, since the surface of the glass fiber has very low chemical reactivity, it may be difficult to cause such chemical reaction with the glass fiber as it is.

Thus, by reacting a silane-based compound with Si—OH groups present on the surface of the glass fiber, chemical bonding can be provided between the resin and the surface of the glass fiber via the terminal amino group or hydroxyl group of the component (a-1) and the functional group-containing compound (component (c)) having at least one functional group selected from the group consisting of a carboxyl group and a group derived from a carboxyl group.

However, the product of the condensation reaction between Si—OH groups and the silane-based compound is liable to decompose in the presence of water, and the silane-based compound may be eliminated from the surface of the glass fiber through a hydrolysis reaction that occurs when the resin containing the components (a-1), (a-2), (b), (c), and (d) as well as other additive components is melt-kneaded in an extruder. In this case, it is difficult to provide chemical bonding between the resin and the glass fiber.

Thus, in the resin composition according to this embodiment, it is desirable that after the components (a-1), (a-2), (b), (c), and (d) are melt-kneaded, most of the Si—OH groups on the surface of the glass fiber are in a state of reacting with the silane-based compound and the amount of unreacted Si—OH groups is below a predetermined level.

Specifically, an area of peaks at 3570 $cm^{-1}$ in an FT-IR spectrum, as measured with a diffusive reflector, is desirably 9 or less, and more preferably 8 or less, when a blank is used as control. Examples of the blank as control include calcium fluoride powder.

As used herein, the term "peaks at 3570 $cm^{-1}$" is intended to include peaks around 3570 $cm^{-1}$ and may include peaks with a peak top at 3565 $cm^{-1}$ to 3585 $cm^{-1}$.

When the area of peaks at 3570 $cm^{-1}$ is larger than 9, it is considered that the Si—OH group has not been chemically bonded to the silane-based compound or that the product of chemical bonding has been separated by hydrolysis. In this case, the chemical bonding between the component (a-1) and the glass fiber, which is responsible for improvement in strength, is insufficient, and the strength of the composition may not be sufficiently improved.

In particular, when aminosilane is used as the silane-based compound and after at least the components (a-1), (a-2), (b), (c), and (d) are melt-kneaded, the content of nitrogen atoms on the surface of the glass fiber is preferably from 1 mass ppm to 500 mass ppm, more preferably from 1 mass ppm to 300 mass ppm, and still more preferably from 10 mass ppm to 80 mass ppm, relative to the mass of the glass fiber. Preferably, aminosilane, which is a nitrogen atom source, is chemically bonded to the surface of the glass fiber.

The state in which the surface of the glass fiber and aminosilane are chemically bonded means a state in which a chemical bond is formed between Si—OH groups of the glass fiber and —$NH_2$ groups of aminosilane, and does not mean a state in which they are present in mixture.

Exemplary methods for quantifying this chemically bonded state by distinguishing the chemically bonded state from a mixed state without chemical bonding include measuring the amount of nitrogen contained in the glass fiber by causing the resin composition after melt-kneading to be dissolved in a chloroform solvent, for example, at room temperature, to remove any insoluble glass fiber; more specific instances are described in the Examples of this disclosure.

If the content of nitrogen atoms detected on the surface of the glass fiber is less than 1 mass ppm, the aminosilane is not bonded to Si—OH groups on the surface of the glass fiber, the chemical bonding between the component (a-1) and the glass fiber is not sufficient, and the strength of the resin composition may not be improved. In addition, if the content of nitrogen atoms detected on the surface of the glass fiber is more than 300 mass ppm, there is excessive aminosilane resulting from condensation and bonded on the surface of the glass fiber. In this case, since the strength of the aminosilane layer is low, the aminosilane portion may be broken at the interface between the resin (a-1) and the glass fiber when a stress is applied to the resin composition, causing a decrease in the strength of the resin composition.

(Method for Producing Resin Composition)

The resin composition according to this embodiment may be produced by melt-kneading the above-described components: the resin composition (a) containing the polyphenylene ether resin (a-1), which is suitably a polyphenylene ether resin exhibiting a melting point, and atactic homopolystyrene (a-2); the hydrogenated block copolymer (b); the functional group-containing compound (c) having at least one functional group selected from the group consisting of a carboxyl group and a group derived from a carboxyl group; the surface-treated inorganic filler (d); and other optional components (e).

The method of producing the resin composition according to this embodiment is not particularly limited as long as it allows for melt-kneading of the components (a) to (d) and the other optional components (e).

For example, a preferred method of producing the resin composition according to this embodiment includes melt-kneading the components (a) to (c) in powder form, and then adding the component (d) in fibrous or powder form for further melt-kneading.

Conventional methods of producing a resin composition include, for example:

(1) melt-kneading the components (a) and (c) simultaneously, and then adding the component (b) and the component (d) in the stated order for further melt-kneading;
(2) melt-kneading the components (a) and (b) simultaneously, and then adding the component (c) and the component (d) in the stated order for further melt-kneading;
(3) melt-kneading the components (a) to (d) all at a time; and
(4) melt-kneading the components (a) to (c) simultaneously into pellets, melt-kneading the pellets again, and then adding the component (d) for further melt-kneading.

With the resin composition obtained with one example of the preferred method of producing a resin composition according to this embodiment, each of the components (a) to (d) contained in the resin composition may be excellent in uniform dispersibility compared with those obtained by the above production methods (1) to (4).

In an example of a more preferable production method for the resin composition according to this embodiment, it is preferable that the component (a-1) in powder form and the components (a-2) to (c) in powder or pellet form are melt-kneaded, a part of the component (d) is added together with the components (a) to (c), the mixture is further melt-kneaded, the remainder of the component (d) is added, and the resulting mixture is further melt-kneaded. At this time, in melt-kneading the components (a) to (c), the presence of a part of the component (d) allows for sufficient mixture of the component (a) to (c), and by performing melt-kneading with the addition of the remainder of the component (d) to the components (a) to (c) sufficiently mixed, it is possible to increase the dispersibility of the component (d) (surface-treated inorganic filler) in the resin composition while improving the adhesion of the component (d) to the resin, and furthermore, to produce a resin composition having melt flowability, impact resistance, and vibration fatigue characteristics.

More specifically, in the preferred method of producing a resin composition according to this embodiment, a multi-screw extruder provided with, from upstream to downstream in the direction of flow of the raw material, a first raw-material feed port, a first vacuum vent, second and succeeding raw-material feed ports, and a second vacuum vent may be used.

In the preferred method of producing a resin composition according to this embodiment, the components (a) to (c) may be fed from the first raw-material feed port, after which the component (d) in fibrous or powdery form may be added from the second raw-material feed port.

In a more preferred method of producing a resin composition according to this embodiment, the components (a) to (c) and a part of the component (d) may be fed from the first raw-material feed port, after which the remainder of the component (d) may be added from the second, third, or other succeeding raw-material feed port.

Apparatus suitably used for melt-kneading the above-mentioned components include, for example, an extruder such as a single-screw extruder or a multi-screw extruder such as a twin screw extruder, a roll, a kneader, a Brabender Plastograph, and a Banbury mixer. In this embodiment, among others, a multi-screw extruder is preferred.

In melt-kneading the components, the melt-kneading temperature may be 260° C. to 350° C. without limitation, and the screw speed may be usually 100 rpm to 1200 rpm without limitation.

A preferred embodiment in the case of using a multi-screw extruder will be described below.

From the perspectives of preventing thermal deterioration and crushing of the inorganic filler and removing volatile matter, the multi-screw extruder preferably comprises the first raw-material feed port on the upstream side in the direction of flow of the raw material, the first vacuum vent downstream from the first raw-material feed port, the second and succeeding raw-material feed ports downstream from the first vacuum vent, and the second vacuum vent downstream from these raw-material feed ports.

Preferably, the multi-screw extruder further comprises kneading sections between the first raw-material feed port and the first vacuum vent, between the first vacuum vent and the second raw-material feed port, and between the second and succeeding raw-material feed ports and the second vacuum vent, respectively.

In this case, from the viewpoint of kneadability and from the perspective of preventing deterioration of the resin, the multi-screw extruder preferably has an L/D (screw barrel's effective length/screw barrel's inner diameter) of 20 or more, and more preferably 30 or more, and is preferably 60 or less, and more preferably 50 or less.

There is no particular limitation on the way of feeding raw materials from the respective raw-material feed ports of the multi-screw extruder, yet the raw materials may be simply added from the upper opening of each raw-material feed port or from the side opening using a forced side feeder.

In the case of a powder raw material, it is preferably added from a side opening using a forced side feeder from the perspective of reducing the formation of crosslinked products and carbides due to the heat history of the resin.

In the case of a liquid raw material, it is preferably added from an upper opening using a plunger pump, a gear pump, or the like.

The upper open mouth of each raw-material feed port of the multi-screw extruder may be opened so as to remove the air conveyed together with the raw material.

The oxygen concentration in each line in the path along which the raw material is fed to the multi-screw extruder (specifically, the path from the stock tank through pipes, a weight-loaded feeder with a refill tank, pipes, a supply hopper to the extruder), particularly in the presence of oxygen, is preferably less than 1.0 vol. % from the perspective of reducing the formation of crosslinked products and carbides due to the thermal history of the resin. From the perspective of maintaining such a low oxygen concentration, it is preferable that each line has high airtightness and that an inert gas (such as nitrogen gas) is introduced therein.

By keeping the oxygen concentration in each line along the aforementioned path below 1.0 vol. %, it is possible to obtain the effect of drastically reducing the raw material adhering to the screws of the multi-screw extruder at the time of melt-kneading the resin mixture (a) containing a polyphenylene ether resin (in particular, a polyphenylene ether resin exhibiting a melting point) (a-1) and atactic homopolystyrene (a-2). With the resin composition produced according to the aforementioned preferred embodiment, an effect of reducing the formation of black spots, carbides, and the like may also be obtained.

In the production of a preferred resin composition according to this embodiment, as described above, from the perspective of suppressing hydrolysis of the product of the condensation reaction between Si—OH groups and the silane-based compound and the consequent elimination of the silane-based compound from the surface of the glass fiber, the moisture content of the components (a-1), (a-2), (b), (c) and (d) to be fed to the extruder is preferably adjusted to 1000 mass ppm or less.

To remove moisture from the raw material before the aforementioned elimination reaction occurs, it is preferable to release the gas inside the extruder which can contain water vapor using a technique such as vacuum vent or open vent.

Although it is impossible to measure the moisture content of the composition inside the multi-screw extruder, when the moisture content of the components (a-1), (a-2), (b), (c), and (d) exceeds 1000 mass ppm or when degassing is not performed to remove moisture using vacuum vent or open vent before contact with the surface of the glass fiber, moisture in the resin may promote an elimination reaction from the product of reaction between Si—OH groups and the silane-based compound.

In particular, as described above, when reacting a silane-based compound with Si—OH groups present on the surface of the glass fiber, a chemical bond may be formed via maleic anhydride as the component (c) in the reaction between polyphenylene ether of the component (a-1) and a functional group such as amine of the silane-based compound. In this reaction, since the amino functional group derived from the polymerization solvent of polyphenylene ether is eliminated and the chemical bond is formed, it is possible to accelerate the reaction by quickly removing the eliminated product from the mixture.

Specifically, in the manufacturing process, it is preferable to remove the eliminated product from the mixture using vacuum vent or release vent, with the residence time set to 3 seconds or more and 10 seconds or less when mixing the resin with the glass fiber.

(Molded Product)

By molding the above-described resin composition according to this embodiment, a molded product made from the resin composition can be obtained.

Advantageously, the molded product made from the resin composition according to this embodiment can be widely used for a variety of molded products, including: mechanical parts for optical equipment; parts for light source lamps; sheets or films for metal film laminated substrates; hard disk internal parts; connector ferrules for optical fibers; copier parts; parts in automotive engine room such as automotive radiator tank parts; automotive lamp parts; parts contacting liquid (especially drinking water) in use and plumbing mechanical parts, such as pump casings (pump housings), valves, pipe blocks, flanges, and filters.

The method of molding the resin composition is not particularly limited, and examples thereof include injection molding, metal in-mold molding, outsert molding, extrusion molding, sheet molding, film molding, hot press molding, rotational molding, and lamination molding.

EXAMPLES

Hereinafter, the present disclosure will be described with reference to specific examples and comparative examples. However, the present disclosure is not so limited.

The following provides a description of the raw materials used in the resin compositions of the Examples and Comparative Examples described later.

—Resin Mixture (a)—
—Polyphenylene Ether Resin (a-1)—

As the component (a-1), a polyphenylene ether resin in powder form was used. In the following, the term "melting point" refers to a peak top temperature in a temperature-heat flow rate graph obtained when the temperature is raised at 20° C./min using a differential scanning calorimeter (DSC).

"(a-1-1)" represents a polyphenylene ether powder obtained by oxidation polymerization of 2,6-xylenol, having a weight average molecular weight (Mw) of 52,000, a reduced viscosity of 0.54 dL/g, and a melting point of 250° C.

"(a-1-2)" represents a polyphenylene ether powder obtained by oxidative polymerization of 2,6-xylenol, having a weight average molecular weight (Mw) of 37,000, a reduced viscosity of 0.44 dL/g, and a melting point of 247° C.

"(a-1-3)" represents a polyphenylene ether powder obtained by oxidation polymerization of 2,6-xylenol, having a weight average molecular weight (Mw) of 56,000, a reduced viscosity of 0.57 dL/g, and a melting point of 250° C.

"(a-1-4)" represents polyphenylene ether pellets that were obtained by melt-kneading the polyphenylene ether powder (a-1-1) under the conditions of cylinder temperature of 300° C., screw speed of 300 rpm, and discharge rate of 40 kg/hour, using a twin-screw extruder (trade name: ZSK-40, manufactured by WERNER & PFLEIDERER), and that came to exhibit no melting point.

—Atactic Homopolystyrene (a-2)—

"(a-2-1)" represents an atactic homopolystyrene (trade name: Polystyrene 685, manufactured by PS Japan Corporation).

"(a-2-x1)" represents a high impact polystyrene (trade name: Polystyrene H9405, manufactured by PS Japan Corporation).

"(a-2-x2)" represents a high impact polystyrene containing 8 mass % of high cis butadiene rubber and having a melt flow rate (MFR) of 3.2 g/10 min.

—Hydrogenated Block Copolymer (b)—

"(b-1)" represents a hydrogenated block copolymer having a block structure of polystyrene-hydrogenated polybutadiene-polystyrene, in which the amount of 1,2-vinyl bonds in the block polymer before hydrogenation is 33%, the styrene content is 33%, the number average molecular weight (Mn) is 246,000, the molecular weight distribution is 1.07, and the hydrogenation ratio in the polybutadiene portion is 99.8%.

"(b-2)" represents a hydrogenated block copolymer having a block structure of polystyrene-hydrogenated polybutadiene-polystyrene, in which the amount of 1,2-vinyl bonds in the block polymer before hydrogenation is 34%, the styrene content is 34%, the number average molecular weight (Mn) is 154,000, the molecular weight distribution is 1.09, and the hydrogenation ratio in the polybutadiene portion is 99.9%.

(b-x1) represents a hydrogenated block copolymer having a block structure of polystyrene-hydrogenated polybutadiene-polystyrene, in which the amount of 1,2-vinyl bonds in the block polymer before hydrogenation is 35%, the styrene content is 33%, the number average molecular weight (Mn) is 139,500, the molecular weight distribution is 1.12, and the hydrogenation ratio in the polybutadiene portion is 99.9%.

"(b-x2)" represents a hydrogenated block copolymer having a block structure of polystyrene-hydrogenated polybutadiene-polystyrene, in which the amount of 1,2 vinyl bonds in the block polymer before hydrogenation is 35%, the styrene content is 33%, the number average molecular weight (Mn) is 249,300, the molecular weight distribution is 1.15, and the hydrogenation ratio in the polybutadiene portion is 96.1%.

—Functional Group-Containing Compound (c)—

"(c-1)" represents a maleic anhydride (trade name: CRYSTAL MAN, manufactured by NOF Corporation).

"(c-2)" represents a citric acid (a special grade reagent, manufactured by Wako Pure Chemical Industries, Ltd.).

—Surface-Treated Inorganic Filler (d)—

"(d-1)" represents glass fibers surface-treated with an aminosilane-based coupling agent, having an average length of 3 mm and an average diameter of 10 μm.

"(d-2)" represents glass fibers surface-treated with an aminosilane-based coupling agent, having an average length of 3 mm and an average diameter of 6 μm.

"(d-3)" represents glass fibers surface-treated with an aminosilane-based coupling agent, having an average length of 3 mm and an average diameter of 13 μm.

"(d-x)" represents glass fibers without surface treatment, having an average length of 3 mm and an average diameter of 10 μm.

The physical properties of the resin compositions of the below-described Examples and Comparative Examples were measured with the following methods (1) and (5).

(1) Melt Flowability

Melt flow rate (MFR) (g/10 min) was measured under the conditions of temperature of 300° C. and load of 49 N in accordance with ASTM-D1238, using pellets of the resin compositions of the below-described Examples and Comparative Examples.

As the evaluation standard, a higher measured value was judged as better melt flowability.

(2) Vibration Fatigue Characteristics

Pellets of the resin compositions of the below-described Examples and Comparative Examples were fed to a screw inline type injection molding machine (trade name: IS-80EPN, manufactured by Toshiba Machine Co., Ltd.) set at 220° C. to 320° C., under the condition of mold temperature of 90° C., to prepare test pieces of JIS K7139 Type A in accordance with JIS K7152-1 and K7313-2. Each test piece was cut into a test piece used for measurement of vibration fatigue properties.

For each test piece for measurement of vibration fatigue properties, the number of vibrations to fracture of the test piece was determined using a hydraulic servo fatigue tester (trade name: EHF-50-10-3, manufactured by Saginomiya Seisakusho, Inc.) in accordance with JIS K 7118 under the conditions of temperature of 23° C., sine wave frequency of 30 Hz, and tensile load of 50 MPa.

As the evaluation standard, those that resisted a larger number of vibrations before rupture were judged as having better vibration fatigue characteristics.

(3) Heat Resistance

Each test piece of JIS K7139 Type A prepared in (2) was cut into a test piece used for measurement of deflection temperature under load.

Each test piece for measurement of deflection temperature under load was measured for the deflection temperature under load (° C.) under a load of 1.81 MPa in accordance with JIS K 7191-1.

As the evaluation standard, a higher measured value was judged as better heat resistance.

(4) Impact Resistance

Each test piece of JIS K7139 Type A prepared in (2) was cut into a test piece used for measurement of Charpy impact strength.

Each test piece for measurement of Charpy impact strength was measured for the Charpy impact strength $(KJ/m^2)$ in accordance with JIS K7111-1/1 eA. As the evaluation standard, a higher measured value was judged as better impact resistance.

(5) Surface Appearance (Silver Streaks)

Pellets of the resin compositions of the below-described Examples and Comparative Examples were each supplied to a screw inline type injection molding machine (trade name: IS-80EPN, manufactured by Toshiba Machine Co., Ltd.) set at 320° C., and after 10 minutes of retention, the pellets were injection-molded at a mold temperature of 90° C. to obtain a pin gate plate (150 mm long×150 mm wide×2 mm thick). The proportion of the area where silver streaks occurred on the surface of a pinpoint gate plate was visually evaluated.

The evaluation criteria are: "A"=almost 0%; "B"=>0% and ≤25%; "C"=>25% and ≤50%; "D"=>50% and ≤75%; and "E"=≥75 and ≤100.

(6) Surface Appearance (Filler Conditions on Surface)

Pellets of the resin compositions of the below-described Examples and Comparative Examples were each fed to a screw inline type injection molding machine (trade name: IS-80EPN, manufactured by Toshiba Machine Co., Ltd.) set at 220° C. to 320° C., under the condition of mold temperature of 90° C., to prepare test pieces of JIS K7139 Type A in accordance with JIS K7152-1 and K7313-2. The surface of each test piece was observed, and the state in which the filler was oriented in the flowing direction to form irregularities was visually evaluated.

The evaluation criteria are: "A"=no orientation of the filler and no consequent irregularities were observed in the appearance; "B"=some orientation of the filler and the consequent irregularities were observed in 30% or less of the surface area; and "C"=some orientation of the filler and the consequent irregularities were observed in 30% or more.

(7) Measurement of the Diameter and Length of the Glass Fibers

The resin components were dissolved from the resin compositions of the below-described Examples and Comparative Examples with a chloroform solvent so that glass fiber components were caused to precipitate and separate. To 5 g of the composition was added 100 g of chloroform, and the mixture was allowed to stand to precipitate the inorganic filler. From the top of the dissolved resin solution, an aliquot of 95% and above of the amount of chloroform charged was taken with a dropper. Chloroform was added again to the glass fibers left after the precipitation, and the process of standing, precipitation, and fractionation was repeated five times in total. To the fifth precipitate was charged 100 g of acetone, the mixture underwent the process of standing, precipitation, and fractionation, and the solvent was changed from chloroform to acetone. This precipitate was transferred to an aluminum dish and dried in a vacuum dryer at 90° C. for 4 hours to completely remove acetone.

For each resulting powder, 1,000 individual images were analyzed with PITA-03 manufactured by Seishin Enterprise Co., Ltd. to calculate the fiber diameter (μm) and the fiber length (μm). The results for 1,000 images were averaged to determine an average of the average fiber diameters (D) and an average of the average fiber lengths (L). The ratio of fiber length to fiber diameter, L/D, was also calculated.

(8) Measurement of the Nitrogen Atom Content on the Surface of the Glass Fibers

The resin components were dissolved from the resin compositions of the below-described Examples and Comparative Examples with a chloroform solvent so that glass fiber components were caused to precipitate and separate. To 5 g of the composition was added 100 g of chloroform, and the mixture was allowed to stand to precipitate the inorganic filler. From the dissolved resin solution, an aliquot of 95% and above of the amount of chloroform charged was taken from the top with a dropper. Chloroform was added again to the glass fibers left after the precipitation, and the process of standing, precipitation, and fractionation was repeated five times in total. To the fifth precipitate was charged 100 g of acetone, the mixture underwent the process of standing, precipitation, and fractionation, and the solvent was changed from chloroform to acetone. This precipitate was transferred to an aluminum dish and dried in a vacuum dryer at 90° C. for 4 hours to completely remove acetone.

Each powder thus obtained was measured for the nitrogen atom content (in mass ppm) using a nitrogen analyzer TN-110 manufactured by Mitsubishi Chemical Corporation. The amount of sample was about 10 mg. The N number was set to 5, and the average was used as a measured value.

(9) Measurement of the Amount of Si—OH Groups on the Surface of the Glass Fibers The resin components were dissolved from the resin compositions of the below-described Examples and Comparative Examples with a chloroform solvent so that glass fiber components were caused to precipitate and separate. To 5 g of the composition was added 100 g of chloroform, and the mixture was allowed to stand to precipitate the inorganic filler. From the dissolved resin solution, an aliquot of 95% and above of the amount of chloroform charged was taken from the top with a dropper. Chloroform was added again to the glass fibers left after the precipitation, and the process of standing, precipitation, and fractionation was repeated five times in total. To the fifth precipitate was charged 100 g of acetone, the mixture underwent the process of standing, precipitation, and fractionation, and the solvent was changed from chloroform to acetone. This precipitate was transferred to an aluminum dish and dried in a vacuum dryer at 90° C. for 4 hours to completely remove acetone.

For each powder thus obtained, measurement was made using FT-IR-6600 and a vacuum/heated diffuse reflectance measurement apparatus DR-650Ai, both manufactured by JASCO Corporation. For the blank, calcium fluoride powder was used. Measurement was made with a resolution of 4 $cm^{-1}$ and the number of integrations of 256 times. The absorption peaks at 3570 $cm^{-1}$ were separated by spectral fitting calculation to determine the area of peaks, and the residual amount of silanol groups was determined.

(10) Measurement of Butadiene in Composition

The concentrations of free butadiene contained in the resin compositions of the below-described Examples and Comparative Examples were determined by gas chromatography using a head space gas chromatograph equipped with a CHROMPACK capillary column CP-PoraPLOT Q-HT having a length of 27.5 m, an inner diameter of 0.32 mm, and a film thickness of 10 μm, under the condition of charge amount of 25 μL.

To prepare a stock solution of 1,3-butadiene, a diaphragm for a 25 mL vial was punctured twice with a hollow needle, leaving the needle in one of the perforations. The vial having the diaphragm and a screw cap was weighed. Then, 20 mL of N, N-dimethylacetamide was pipetted into the vial. The vial was weighed again. The vial containing the hollow needle and the second perforation was closed with the screw cap. Approximately 0.3 g of 1,3-butadiene was introduced into the vial from the second perforation via a thin tube, working in the fume hood. The vial having the screw cap and the hollow needle was weighed again. The concentration of 1,3-butadiene in the vial was determined as the weight in mg of 1,3-butadiene per 1 g of the solution.

To prepare standard solutions of 1,3-butadiene, four sample vials having a diaphragm and a cap were weighed. Then, 20 mL of N, N-dimethylacetamide was pipetted into each vial. Then, 0.1 mL, 0.5 mL, 1.0 mL, and 2.0 mL of 1,3-butadiene stock solutions were pipetted into the vials, respectively. The vials were reweighed. The concentration of 1,3-butadiene in each vial was determined as the weight in mg of 1,3-butadiene per 1 g of the solution. Then, 20 mL of N, N-dimethylacetamide was pipetted into a 25 mL vial, the cap was closed, and 40 μL of n-pentane was added via a syringe to prepare an internal standard solution.

Analytical samples were prepared by the following method. An empty 25 mL vial was purged with purified nitrogen. A head space vial having a diaphragm and a cap was weighed. Approximately 1.00 g of a solid sample was weighed with accurately recorded mass and introduced into the vial. Then, 5 mL of N, N-dimethylacetamide was pipetted into the vial, and the vial was capped.

Then, 20 μL of an internal standard solution was added to the vial from the diaphragm via a syringe. This procedure was repeated to prepare vial samples.

Then, 20 μL each of 1,3-butadiene standard solutions A, B, C, D and 20 μL of the sample to be analyzed were introduced into vials.

These vials were placed in a shaker and shaken overnight. A 1 μL volume of each sample headspace was analyzed by gas chromatography, and the area of peaks for the n-pentane internal standard and 1,3-butadiene was recorded. For each sample, the concentration of 1,3-butadiene was determined as the ratio of the area of peaks of 1,3-butadiene to the area of peaks of n-pentane. The ratio of the area of peaks to the concentration of added 1,3-butadiene was plotted and fitted to the equation $y=ax+b$ (y: ratio of the area of peaks of 1,3-butadiene to the area of peaks of n-pentane, a: gradient of regression (kg/mg), x: concentration of 1,3-butadiene (mg/kg) in solid, b: intercept of regression line).

The concentration of butadiene in solid was determined as b/a (a: slope of regression line (kg/mg), b: intercept of regression line).

The result was the concentration of 1,3-butadiene in solid expressed in mg of 1,3-butadiene per kg of the resin composition (i.e., mass ppm of 1,3-butadiene). The detection limit of analysis was 0.03 mass ppm.

The following provides a description of the method of measuring the weight average molecular weight (Mw) of the component (a-1) in the resin compositions of the below-described Examples and Comparative Examples.

Measurement was made of the polystyrene-equivalent weight average molecular weight (Mw) of the pellets of the obtained resin compositions and the test pieces of JIS K7139 Type A prepared in (2), using gel permeation chromatography (trade name: System 21, manufactured by Showa Denko K.K.) under the conditions of standard material: polystyrene, solvent: chloroform, solvent flow rate: 1.0 mL/min, column temperature: 40° C., UV wavelength of detection part: 283 nm for polyphenylene ether resin and 254 nm for standard polystyrene.

Examples 1-9, 12, 14-17, and Comparative Examples 1-12

As a melt kneader, a twin-screw extruder (trade name: ZSK-40, manufactured by COPERION) was used.

The extruder was provided with a first raw-material feed port on the upstream side in the direction of flow of the raw material, a first vacuum vent downstream from the first raw-material feed port, second and third raw-material feed ports downstream from the first vacuum vent, and a second vacuum vent downstream from the third raw-material feed port.

On the upstream side of the second raw-material feed port, a forward kneading disc was installed over a length of 60 mm in terms of L/D of the extruder. On the downstream side of the second material feed port, a forward screw was also installed over a length of 60 mm, followed by a forward kneading disc over a length of 60 mm.

At the second and third raw-material feed ports, raw materials were respectively fed from the side openings using the forced side feeders.

Then, using the twin-screw extruder with the aforementioned setup, the resin mixture (a) containing the components (a-1) and (a-2), the hydrogenated block copolymer (b), the functional group-containing compound (c), and the surface-treated inorganic filler (d) were melt-kneaded with the compositions presented in Table 1 below, and resin compositions of pellets were prepared. The kneading conditions were: extrusion temperature of 250° C. to 320° C., screw rotation speed of 300 rpm, and discharge rate of 80 kg/hour.

Example 10

As a melt kneader, a twin-screw extruder (trade name: ZSK-40, manufactured by COPERION) was used.

First, second, and third raw-material feed ports were provided at the same positions as in Examples 1-9. All the vacuum vents used in Examples 1-9 were equipped with blind stoppers.

At the second and third raw-material feed ports, raw materials were respectively fed from the side openings using the forced side feeders.

On the upstream side of the second raw-material feed port was provided a forward kneading disc over a length of 20 mm in terms of L/D of the extruder. On the downstream side of the second material supply port, a forward screw was also installed over a length of 20 mm, followed by a forward kneading disc over a length of 80 mm.

The charging positions of the raw materials were as presented in Table 1. The same kneading conditions were set as in Examples 1-9.

Example 11

As a melt kneader, a twin-screw extruder (trade name: ZSK-40, manufactured by COPERION) was used.

First, second, and third raw-material feed ports were provided at the same positions as in Examples 1-9. All the vacuum vents used in Examples 1-9 were equipped with blind stoppers.

At the second and third raw-material feed ports, raw materials were respectively fed from the side openings using the forced side feeders.

On the upstream side of the second raw-material feed port was provided a forward kneading disc over a length of 80 mm in terms of L/D of the extruder. On the downstream side of the second material supply port, a forward screw was also installed over a length of 60 mm, followed by a forward kneading disc over a length of 20 mm.

The charging positions of the raw materials were as presented in Table 1. The same kneading conditions were set as in Examples 1-9.

Example 13

In particular, for Example 13, a twin-screw extruder (trade name: ZSK-40, manufactured by WERNER & PFLEIDERER) was used for melt-kneading of the components (a-1-1), (a-2), (b-1), (c-1) fed from the first raw-material feed port as presented in Table 1 below, and a composition of pellets was prepared. The kneading conditions were: extrusion temperature of 300° C., screw speed of 300 rpm, and discharge rate of 80 kg/hour. In this way, a composition containing the component (a-1-1) exhibiting no melting point was prepared. Thereafter, the composition of the prepared pellets and the component (d-1) charged through the second raw-material feed port were further melt-kneaded.

TABLE 1

|  |  |  | Example 1 | Example 2 | Example 3 | Example 4 | Example 5 | Example 6 | Example 7 | Example 8 | Example 9 |
|---|---|---|---|---|---|---|---|---|---|---|---|
| Resin composition | Component (a) | mass % | 66.7 | 66.7 | 53.7 | 84.7 | 66.7 | 51.7 | 66.7 | 66.7 | 66.7 |
|  | Component (b) | mass % | 5 | 5 | 18 | 5 | 5 | 20 | 5 | 5 | 5 |
|  | Component (c) | mass % | 0.3 | 0.3 | 0.3 | 0.3 | 0.3 | 0.3 | 0.3 | 0.3 | 0.3 |

TABLE 1-continued

| | | | | | | | | | | | | |
|---|---|---|---|---|---|---|---|---|---|---|---|---|
| | Component (d) | | mass % | 28 | 28 | 28 | 10 | 28 | 28 | 28 | 28 | 28 |
| | Component (e) | | mass % | 0 | 0 | 0 | 0 | 0 | 0 | 0 | 0 | 0 |
| | Total content | | mass % | 100 | 100 | 100 | 100 | 100 | 100 | 100 | 100 | 100 |
| | Content of component (a-2) per 100 parts by mass of components (a-1) and (a-2) in total | | pts. by mass | 48 | 48 | 47 | 48 | 48 | 48 | 48 | 48 | 48 |
| Production method for resin composition | First raw-material feed port | (a-1-1) | mass % | 35 | — | 28.2 | 44.4 | 35 | 27.1 | 35 | 35 | 35 |
| | | (a-1-2) | mass % | — | 35 | — | — | — | — | — | — | — |
| | | (a-1-3) | mass % | — | — | — | — | — | — | — | — | — |
| | | (a-1-4) | mass % | — | — | — | — | — | — | — | — | — |
| | | (a-2-1) | mass % | 31.7 | 31.7 | 25.5 | 40.3 | 31.7 | 24.6 | 31.7 | 31.7 | 31.7 |
| | | (a-2-x1) | mass % | — | — | — | — | — | — | — | — | — |
| | | (a-2-x2) | mass % | — | — | — | — | — | — | — | — | — |
| | | (b-1) | mass % | 5 | 5 | 18 | 5 | — | 20 | 5 | 5 | 5 |
| | | (b-2) | mass % | — | — | — | — | 5 | — | — | — | — |
| | | (b-x1) | mass % | — | — | — | — | — | — | — | — | — |
| | | (b-x2) | mass % | — | — | — | — | — | — | — | — | — |
| | | (c-1) | mass % | 0.3 | 0.3 | 0.3 | 0.3 | 0.3 | 0.3 | — | 0.3 | 0.3 |
| | | (c-2) | mass % | — | — | — | — | — | — | 0.3 | — | — |
| | | (d-1) | mass % | — | — | — | — | — | — | — | — | — |
| | Second raw-material feed port | (b-1) | mass % | — | — | — | — | — | — | — | — | — |
| | | (c-1) | mass % | — | — | — | — | — | — | — | — | — |
| | | (c-2) | mass % | — | — | — | — | — | — | — | — | — |
| | | (d-1) | mass % | 28 | 28 | 28 | 10 | 28 | 28 | 28 | — | — |
| | | (d-2) | mass % | — | — | — | — | — | — | — | 28 | — |
| | | (d-3) | mass % | — | — | — | — | — | — | — | — | 28 |
| | | (d-x) | mass % | — | — | — | — | — | — | — | — | — |
| | Third raw-material feed port | (d-1) | mass % | — | — | — | — | — | — | — | — | — |
| Test results | (1) Melt flowability | MFR | g/10 min | 7 | 10 | 3 | 10 | 8 | 2 | 7 | 6 | 9 |
| | (2) Vibration fatigue characteristics | Number of vibrations to fracture | $10^3$ times | 472 | 408 | 441 | 276 | 453 | 422 | 459 | 722 | 444 |
| | (3) Heat resistance | Deflection temperature under load | ° C. | 144 | 142 | 146 | 115 | 142 | 145 | 145 | 149 | 142 |
| | (4) Impact resistance | Charpy impact strength | KJ/m² | 18 | 15 | 24 | 11 | 17 | 25 | 17 | 24 | 16 |
| | (5) Surface appearance | Evaluation for silver streaks | — | A | A | B | A | A | B | A | A | A |
| | (6) Surface appearance | Evaluation for filler conditions on the surface | — | A | A | A | A | A | A | A | A | A |
| | (7) Diameter and length of glass fiber | Average fiber diameter (D) | μm φ | 10 | 10 | 10 | 10 | 10 | 10 | 10 | 6 | 13 |
| | | Average fiber length (L) | μm | 265 | 270 | 255 | 200 | 255 | 255 | 255 | 150 | 320 |
| | | Fiber length/Fiber diameter (L/D) | — | 26.5 | 27.0 | 25.5 | 20.0 | 25.5 | 25.5 | 25.5 | 25.0 | 24.6 |
| | (8) Nitrogen atom content of the glass fiber | | mass ppm | 50 | 60 | 70 | 50 | 70 | 60 | 70 | 60 | 60 |
| | (9) Area of peaks at 3570 cm−1 on the surface of the glass fiber | | — | 7 | 8 | 8 | 6 | 7 | 8 | 6 | 6 | 7 |
| | (10) Butadiene content (in mg per kg of the resin composition) | | mass ppm | <0.5 | <0.5 | <0.5 | <0.5 | <0.5 | <0.5 | <0.5 | <0.5 | <0.5 |
| | Weight average molecular weight of component (a-1) (Mw) (pellets) | | ×10⁴ | 6.7 | 4.9 | 6.8 | 6.8 | 6.6 | 6.9 | 6.8 | 6.8 | 6.6 |
| | Weight average molecular weight of component (a-1) (Mw) (test piece) | | ×10⁴ | 6.8 | 5 | 6.9 | 6.9 | 6.7 | 6.9 | 6.8 | 6.9 | 6.7 |

| | | | | Example 10 | Example 11 | Example 12 | Example 13(*) | Example 14 | Example 15 | Example 16 | Example 17 |
|---|---|---|---|---|---|---|---|---|---|---|---|
| Resin composition | Component (a) | | mass % | 66.7 | 66.7 | 64.7 | 66.7 | 66.7 | 66.7 | 66.7 | 74.7 |
| | Component (b) | | mass % | 5 | 5 | 5 | 5 | 5 | 5 | 5 | 5 |
| | Component (c) | | mass % | 0.3 | 0.3 | 0.3 | 0.3 | 0.3 | 0.3 | 0.3 | 0.3 |
| | Component (d) | | mass % | 28 | 28 | 30 | 28 | 28 | 28 | 28 | 20 |
| | Component (e) | | mass % | 0 | 0 | 0 | 0 | 0 | 0 | 0 | 0 |
| | Total content | | mass % | 100 | 100 | 100 | 100 | 100 | 100 | 100 | 100 |
| | Content of component (a-2) per 100 parts by mass of components (a-1) and (a-2) in total | | pts. by mass | 48 | 48 | 50 | 48 | 48 | 48 | 48 | 50 |
| Production method for resin composition | First raw-material feed port | (a-1-1) | mass % | 35 | 35 | 32.5 | 35 | 35 | 35 | 35 | 37.5 |
| | | (a-1-2) | mass % | — | — | — | — | — | — | — | — |
| | | (a-1-3) | mass % | — | — | — | — | — | — | — | — |
| | | (a-1-4) | mass % | — | — | — | — | — | — | — | — |

TABLE 1-continued

|  |  |  |  |  |  |  |  |  |  |  |
|---|---|---|---|---|---|---|---|---|---|---|
|  |  | (a-2-1) | mass % | 31.7 | 31.7 | 32.2 | 31.7 | 31.7 | 31.7 | 31.7 | 37.2 |
|  |  | (a-2-x1) | mass % | — | — | — | — | — | — | — | — |
|  |  | (a-2-x2) | mass % | — | — | — | — | — | — | — | — |
|  |  | (b-1) | mass % | 5 | 5 | 5 | 5 | — | 5 | 5 | 5 |
|  |  | (b-2) | mass % | — | — | — | — | — | — | — | — |
|  |  | (b-x1) | mass % | — | — | — | — | — | — | — | — |
|  |  | (b-x2) | mass % | — | — | — | — | — | — | — | — |
|  |  | (c-1) | mass % | 0.3 | 0.3 | 0.3 | 0.3 | 0.3 | — | 0.3 | 0.3 |
|  |  | (c-2) | mass % | — | — | — | — | — | — | — | — |
|  |  | (d-1) | mass % | — | — | — | — | — | — | 28 | — |
|  | Second raw-material feed port | (b-1) | mass % | — | — | — | — | 5 | — | — | — |
|  |  | (c-1) | mass % | — | — | — | — | — | 0.3 | — | — |
|  |  | (c-2) | mass % | — | — | — | — | — | — | — | — |
|  |  | (d-1) | mass % | — | — | 30 | 28 | — | — | — | 20 |
|  |  | (d-2) | mass % | — | — | — | — | — | — | — | — |
|  |  | (d-3) | mass % | 28 | 28 | — | — | — | — | — | — |
|  |  | (d-x) | mass % | — | — | — | — | — | — | — | — |
|  | Third raw-material feed port | (d-1) | mass % | — | — | — | — | 28 | 28 | — | — |
| Test results | (1) Melt flowability | MFR | g/10 min | 9 | 9 | 5 | 8 | 8 | 6 | 5 | 10 |
|  | (2) Vibration fatigue characteristics | Number of vibrations to fracture | $10^3$ times | 156 | 182 | 478 | 403 | 412 | 421 | 399 | 414 |
|  | (3) Heat resistance | Deflection temperature under load | °C. | 142 | 142 | 144 | 142 | 140 | 143 | 141 | 141 |
|  | (4) Impact resistance | Charpy impact strength | KJ/m$^2$ | 9 | 8 | 17 | 14 | 30 | 32 | 8 | 20 |
|  | (5) Surface appearance | Evaluation for silver streaks | — | A | B | A | A | A | A | B | A |
|  | (6) Surface appearance | Evaluation for filler conditions on the surface | — | A | A | A | A | B | B | A | A |
|  | (7) Diameter and length of glass fiber | Average fiber diameter (D) | μm φ | 13 | 13 | 10 | 10 | 10 | 10 | 10 | 10 |
|  |  | Average fiber length (L) | μm | 270 | 340 | 255 | 255 | 510 | 520 | 160 | 255 |
|  |  | Fiber length/Fiber diameter (L/D) | — | 20.8 | 26.2 | 25.5 | 25.5 | 51.0 | 52.0 | 16.0 | 25.5 |
|  | (8) Nitrogen atom content of the glass fiber | | mass ppm | 5 | 90 | 60 | 60 | 60 | 60 | 60 | 60 |
|  | (9) Area of peaks at 3570 cm$^{-1}$ on the surface of the glass fiber | | — | 11 | 5 | 7 | 7 | 7 | 7 | 7 | 7 |
|  | (10) Butadiene content (in mg per kg of the resin composition) | | mass ppm | <0.5 | <0.5 | <0.5 | <0.5 | <0.5 | <0.5 | <0.5 | <0.5 |
|  | Weight average molecular weight of component (a-1) (Mw) (pellets) | | ×10$^4$ | 6.6 | 6.6 | 6.6 | 6.8 | 6.8 | 6.8 | 6.8 | 6.6 |
|  | Weight average molecular weight of component (a-1) (Mw) (test piece) | | ×10$^4$ | 6.7 | 6.7 | 6.7 | 6.6 | 6.8 | 6.9 | 6.8 | 6.7 |

(*)The components charged from the first raw-material feed port were subjected to extrusion.

TABLE 2

|  |  |  |  | Comparative Example 1 | Comparative Example 2 | Comparative Example 3 | Comparative Example 4 | Comparative Example 5 | Comparative Example 6 |
|---|---|---|---|---|---|---|---|---|---|
| Resin composition | Component (a) |  | mass % | 66.7 | 66.7 | 66.7 | 46.7 | 67 | 66.4 |
|  | Component (b) |  | mass % | 5 | 0 | 0 | 25 | 5 | 5 |
|  | Component (c) |  | mass % | 0.3 | 0.3 | 0.3 | 0.3 | 0 | 0.6 |
|  | Component (d) |  | mass % | 28 | 28 | 28 | 28 | 28 | 28 |
|  | Component (e) |  | mass % | 0 | 5 | 5 | 0 | 0 | 0 |
|  | Total |  | mass % | 100 | 100 | 100 | 100 | 100 | 100 |
|  | Content of component (a-2) per 100 parts by mass of components (a-1) and (a-2) in total |  | pts. by mass | 48 | 48 | 48 | 48 | 48 | 47 |
| Production method for resin composition | First raw-material feed port | (a-1-1) | mass % | — | 35 | 35 | 24.5 | 35 | 35 |
|  |  | (a-1-2) | mass % | — | — | — | — | — | — |
|  |  | (a-1-3) | mass % | 35 | — | — | — | — | — |
|  |  | (a-1-4) | mass % | — | — | — | — | — | — |

TABLE 2-continued

|  |  |  | | | | | | | |
|---|---|---|---|---|---|---|---|---|---|
| | | (a-2-1) | mass % | 31.7 | 31.7 | 31.7 | 22.2 | 32 | 31.4 |
| | | (a-2-x1) | mass % | — | — | — | — | — | — |
| | | (a-2-x2) | mass % | — | — | — | — | — | — |
| | | (b-1) | mass % | 5 | — | — | 25 | 5 | 5 |
| | | (b-2) | mass % | — | — | — | — | — | — |
| | | (b-x1) | mass % | — | 5 | — | — | — | — |
| | | (b-x2) | mass % | — | — | 5 | — | — | — |
| | | (c-1) | mass % | 0.3 | 0.3 | 0.3 | 0.3 | 0 | 0.6 |
| | | (c-2) | mass % | — | — | — | — | — | — |
| | | (d-1) | mass % | — | — | — | — | — | — |
| | Second raw-material feed port | (b-1) | mass % | — | — | — | — | — | — |
| | | (c-1) | mass % | — | — | — | — | — | — |
| | | (c-2) | mass % | — | — | — | — | — | — |
| | | (d-1) | mass % | 28 | 28 | 28 | 28 | 28 | 28 |
| | | (d-2) | mass % | — | — | — | — | — | — |
| | | (d-3) | mass % | — | — | — | — | — | — |
| | | (d-x) | mass % | — | — | — | — | — | — |
| | Third raw-material feed port | (d-1) | mass % | — | — | — | — | — | — |
| Test results | (1) Melt flowability | MFR | g/10 min | 5 | 8 | 4 | 0.5 | 3 | 10 |
| | (2) Vibration fatigue characteristics | Number of vibrations to fracture | 10³ times | 468 | 386 | 352 | 331 | 321 | 454 |
| | (3) Heat resistance | Deflection temperature under load | °C. | 144 | 142 | 136 | 144 | 144 | 143 |
| | (4) Impact resistance | Charpy impact strength | KJ/m² | 17 | 14 | 13 | 26 | 13 | 17 |
| | (5) Surface appearance | Evaluation for silver streaks | — | B | B | D | D | B | D |
| | (6) Surface appearance | Evaluation for filler conditions on the surface | — | A | A | A | A | A | A |
| | (7) Diameter and length of glass fiber | Average fiber diameter (D) | μm φ | 10 | 10 | 10 | 10 | 10 | 10 |
| | | Average fiber length (L) | μm | 260 | 255 | 255 | 250 | 255 | 255 |
| | | Fiber length/Fiber diameter (L/D) | — | 26.0 | 25.5 | 25.5 | 25.0 | 25.5 | 25.5 |
| | (8) Nitrogen atom content of the glass fiber | | mass ppm | 60 | 60 | 60 | 60 | 60 | 60 |
| | (9) Area of peaks at 3570 cm⁻¹ on the surface of the glass fiber | | — | 7 | 6 | 7 | 8 | 7 | 7 |
| | (10) Butadiene content (in mg per kg of the resin composition) | | mass ppm | <0.5 | <0.5 | 1.9 | <0.5 | <0.5 | <0.5 |
| | Weight average molecular weight of component (a-1) (Mw) (pellets) | | ×10⁴ | 7.2 | 6.8 | 7 | 6.9 | 7.6 | 6.5 |
| | Weight average molecular weight of component (a-1) (Mw) (test piece) | | ×10⁴ | 7.3 | 6.8 | 7.2 | 6.9 | 7.9 | 6.3 |

| | | | | Comparative Example 7 | Comparative Example 8 | Comparative Example 9 | Comparative Example 10 | Comparative Example 11 | Comparative Example 12 |
|---|---|---|---|---|---|---|---|---|---|
| Resin composition | Component (a) | | mass % | 66.7 | 50 | 94.7 | 35 | 35 | 62.7 |
| | Component (b) | | mass % | 5 | 20 | 2 | 5 | 5 | 5 |
| | Component (c) | | mass % | 0.3 | 0.5 | 0.3 | 0.3 | 0.3 | 0.3 |
| | Component (d) | | mass % | 0 | 29.5 | 3 | 28 | 28 | 32 |
| | Component (e) | | mass % | 28 | 0 | 0 | 31.7 | 31.7 | 0 |
| | Total | | mass % | 100 | 100 | 100 | 100 | 100 | 100 |
| | Content of component (a-2) per 100 parts by mass of components (a-1) and (a-2) in total | | pts. by mass | 48 | 48 | 48 | 0 | 0 | 48 |
| Production method for resin composition | First raw-material feed port | (a-1-1) | mass % | 35 | 26.1 | 49.6 | 35 | 35 | 32.6 |
| | | (a-1-2) | mass % | — | — | — | — | — | — |
| | | (a-1-3) | mass % | — | — | — | — | — | — |
| | | (a-1-4) | mass % | — | — | — | — | — | — |
| | | (a-2-1) | mass % | 31.7 | 23.9 | 45.1 | — | — | 30.1 |
| | | (a-2-x1) | mass % | — | — | — | 31.7 | — | — |
| | | (a-2-x2) | mass % | — | — | — | — | 31.7 | — |
| | | (b-1) | mass % | 5 | 20 | 2 | 5 | 5 | 5 |
| | | (b-2) | mass % | — | — | — | — | — | — |
| | | (b-x1) | mass % | — | — | — | — | — | — |
| | | (b-x2) | mass % | — | — | — | — | — | — |

TABLE 2-continued

| | | | | | | | | |
|---|---|---|---|---|---|---|---|---|
| | | (c-1) | mass % | 0.3 | 0.5 | 0.3 | 0.3 | 0.3 | 0.3 |
| | | (c-2) | mass % | — | — | — | — | — | — |
| | | (d-1) | mass % | — | — | — | — | — | — |
| | Second raw-material feed port | (b-1) | mass % | — | — | — | — | — | — |
| | | (c-1) | mass % | — | — | — | — | — | — |
| | | (c-2) | mass % | — | — | — | — | — | — |
| | | (d-1) | mass % | — | 29.5 | 3 | 28 | 28 | 32 |
| | | (d-2) | mass % | — | — | — | — | — | — |
| | | (d-3) | mass % | — | — | — | — | — | — |
| | | (d-x) | mass % | 28 | — | — | — | — | — |
| | Third raw-material feed port | (d-1) | mass % | — | — | — | — | — | — |
| Test results | (1) Melt flowability | MFR | g/10 min | 7 | 0.8 | 9 | 7 | 8 | 4 |
| | (2) Vibration fatigue characteristics | Number of vibrations to fracture | 10³ times | 302 | 333 | 189 | 285 | 244 | 465 |
| | (3) Heat resistance | Deflection temperature under load | °C. | 142 | 156 | 122 | 138 | 137 | 148 |
| | (4) Impact resistance | Charpy impact strength | KJ/m² | 12 | 24 | 6 | 19 | 14 | 17 |
| | (5) Surface appearance | Evaluation for silver streaks | — | B | B | A | D | D | B |
| | (6) Surface appearance | Evaluation for filler conditions on the surface | — | C | A | A | A | A | A |
| | (7) Diameter and length of glass fiber | Average fiber diameter (D) | μm φ | 10 | 10 | 10 | 10 | 10 | 10 |
| | | Average fiber length (L) | μm | 270 | 255 | 190 | 255 | 255 | 250 |
| | | Fiber length/Fiber diameter (L/D) | — | 27.0 | 25.5 | 19.0 | 25.5 | 25.5 | 25.0 |
| | (8) Nitrogen atom content of the glass fiber | | mass ppm | ND | 60 | 60 | 60 | 60 | 60 |
| | (9) Area of peaks at 3570 cm−1 on the surface of the glass fiber | | — | 11 | 7 | 7 | 7 | 7 | 7 |
| | (10) Butadiene content (in mg per kg of the resin composition) | | mass ppm | <0.5 | <0.5 | <0.5 | <0.5 | 2.9 | <0.5 |
| | Weight average molecular weight of component (a-1) (Mw) (pellets) | | ×10⁴ | 6.8 | 7.1 | 6.9 | 6.7 | 6.7 | 7.1 |
| | Weight average molecular weight of component (a-1) (Mw) (test piece) | | ×10⁴ | 7 | 7.2 | 7.2 | 6.8 | 6.9 | 7.2 |

It can be seen from Tables 1 and 2 that the resin compositions of Examples 1-17 have excellent melt flowability and vibration fatigue characteristics, as well as heat resistance and impact resistance while maintaining a good balance with these properties, and also exhibit excellent surface appearance, as compared with the resin compositions of Comparative Examples 1-12.

INDUSTRIAL APPLICABILITY

According to the present disclosure, it is possible to provide a resin composition that has excellent melt flowability and vibration fatigue characteristics, that has heat resistance and impact resistance while maintaining a good balance with these properties, and that exhibits excellent surface appearance.

For example, the resin composition disclosed herein can be used as the raw material for the following: optical equipment mechanical parts, such as chassis, cabinets, and optical pickup slide bases, for compact disc read only memory (CD-ROM), digital versatile disc read only memory (DVD-ROM), compact disc recordable (CD-R), digital versatile disc recordable dash R (DVD-R) standard, digital versatile disk recordable plus R (DVD+R) standard, compact disc rewritable (CD-RW), digital versatile disc-rewritable dash R (DVD-RW) standard, digital versatile disc rewritable plus R (DVD+RW) standard, digital versatile disk random access memory (DVD-RAM), and the like; parts for light source lamps; sheets or films for metal film lamination substrates; hard disk internal parts; optical fiber connector ferrules; laser beam printer internal parts; printer parts such as ink jet printer internal parts; copier parts; automotive engine room parts such as automobile radiator tank parts; automotive lamp parts; and liquid contact parts such as pump casings (pump housings), valves, piping blocks, and flanges. Therefore, the present disclosure is industrially applicable.

The invention claimed is:

1. A resin composition comprising the following components:
   a resin mixture (a) containing a component (a-1) and a component (a-2) in a total amount of the components (a-1) and (a-2) of more than 50 mass % and less than 94 mass %, the component (a-1) being a polyphenylene ether resin (a-1) and the component (a-2) being atactic homopolystyrene (a-2);
   a hydrogenated block copolymer (b) in an amount of 1 mass % or more and 20 mass % or less, the hydrogenated block copolymer (b) being obtained by hydrogenating at least part of a block copolymer containing a polymer block A composed mainly of a vinyl aromatic compound and a polymer block B composed mainly of a conjugated diene compound;

a functional group-containing compound (c) in an amount of 0.01 mass % or more and 0.5 mass % or less, the functional group-containing compound (c) having at least one functional group selected from the group consisting of a carboxyl group and a group derived from a carboxyl group; and a surface-treated inorganic filler (d) in an amount of 5 mass % or more and less than 30 mass %, wherein the resin composition does not substantially contain a polymer having a hydrogenation ratio of less than 98% in a conjugated diene compound portion, the component (a-1) has a weight average molecular weight, Mw, of less than 70,000, and the component (b) has a number average molecular weight, Mn, of 150,000 or more and 300,000 or less.

2. The resin composition according to claim 1, wherein the component (a-1) exhibits a melting point.

3. The resin composition according to claim 1, wherein the component (a-2) is contained in an amount of 0.1 parts by mass or more and 95 parts by mass or less per 100 parts by mass in total of the components (a-1) and (a-2).

4. The resin composition according to claim 1, wherein the component (c) is at least one compound selected from the group consisting of fumaric acid, maleic acid and maleic anhydride, succinic acid, citric acid, aconitic acid, itaconic acid, citraconic acid, and mesaconic acid.

5. The resin composition according to claim 1, wherein the component (d) is an inorganic filler surface-treated with aminosilane or epoxysilane.

6. The resin composition according to claim 1, wherein the component (d) is a surface-treated glass fiber, and a ratio of an average fiber length L to an average fiber diameter D of the glass fiber, as expressed by L/D, is from 24 to 50.

7. The resin composition according to claim 1, wherein the component (d) is a surface-treated glass fiber, and an area of peaks at 3570 $cm^{-1}$ in an FT-IR spectrum, as measured on the surface of the glass fiber using a diffusive reflector, is 9 or less when calcium fluoride powder is used as a blank.

8. The resin composition according to claim 1, wherein the component (d) is a surface-treated glass fiber, and the surface of the glass fiber contains nitrogen atoms in an amount of 1 mass ppm or more and 500 mass ppm or less relative to the mass of the glass fiber.

9. The resin composition according to claim 8, wherein the component (d) is a surface-treated glass fiber, and the surface of the glass fiber contains nitrogen atoms in an amount of 10 mass ppm or more and 80 mass ppm or less relative to the mass of the glass fiber.

10. A molded product comprising the resin composition as recited in claim 1.

11. A plumbing mechanical component formed from the molded product as recited in claim 10.

12. The plumbing mechanical component according to claim 11, wherein the plumbing mechanical component is used in contact with drinking water.

13. The resin composition according to claim 2, wherein the component (a-2) is contained in an amount of 0.1 parts by mass or more and 95 parts by mass or less per 100 parts by mass in total of the components (a-1) and (a-2).

14. The resin composition according to claim 2, wherein the component (c) is at least one compound selected from the group consisting of fumaric acid, maleic acid and maleic anhydride, succinic acid, citric acid, aconitic acid, itaconic acid, citraconic acid, and mesaconic acid.

15. The resin composition according to claim 3, wherein the component (c) is at least one compound selected from the group consisting of fumaric acid, maleic acid and maleic anhydride, succinic acid, citric acid, aconitic acid, itaconic acid, citraconic acid, and mesaconic acid.

16. The resin composition according to claim 15, wherein the component (d) is an inorganic filler surface-treated with aminosilane or epoxysilane.

17. The resin composition according to claim 15, wherein the component (d) is a surface-treated glass fiber, and a ratio of an average fiber length L to an average fiber diameter D of the glass fiber, as expressed by L/D, is from 24 to 50.

18. The resin composition according to claim 15, wherein the component (d) is a surface-treated glass fiber, and an area of peaks at 3570 $cm^{-1}$ in an FT-IR spectrum, as measured on the surface of the glass fiber using a diffusive reflector, is 9 or less when calcium fluoride powder is used as a blank.

19. The resin composition according to claim 15, wherein the component (d) is a surface-treated glass fiber, and the surface of the glass fiber contains nitrogen atoms in an amount of 1 mass ppm or more and 500 mass ppm or less relative to the mass of the glass fiber.

20. The resin composition according to claim 15, wherein the component (d) is a surface-treated glass fiber, and the surface of the glass fiber contains nitrogen atoms in an amount of 10 mass ppm or more and 80 mass ppm or less relative to the mass of the glass fiber.

* * * * *